United States Patent
Dearborn et al.

(10) Patent No.: US 11,379,881 B1
(45) Date of Patent: Jul. 5, 2022

(54) SYSTEMS AND METHODS FOR PROVIDING VIDEO HEADER BIDDING TO A PUBLISHER

(71) Applicant: Servemotion, Inc., New York, NY (US)

(72) Inventors: Matthew B. Dearborn, New York, NY (US); David M. Himrod, New York, NY (US); Joseph R. Hirsch, New York, NY (US); C. Hagan Major, New York, NY (US)

(73) Assignee: Servemotion, Inc., New York, NY (US)

( * ) Notice: Subject to any disclaimer, the term of this patent is extended or adjusted under 35 U.S.C. 154(b) by 0 days.

(21) Appl. No.: 16/202,974

(22) Filed: Nov. 28, 2018

Related U.S. Application Data

(63) Continuation-in-part of application No. 15/449,451, filed on Mar. 3, 2017.

(60) Provisional application No. 62/591,570, filed on Nov. 28, 2017.

(51) Int. Cl.
*G06Q 30/02* (2012.01)

(52) U.S. Cl.
CPC ..... *G06Q 30/0275* (2013.01); *G06Q 30/0277* (2013.01)

(58) Field of Classification Search
CPC ............ G06Q 30/0275; G06Q 30/0277
USPC ............................ 705/14.73, 14.66
See application file for complete search history.

(56) References Cited

U.S. PATENT DOCUMENTS

| | | | |
|---|---|---|---|
| 9,462,354 B2 | 10/2016 | Phan et al. | |
| 2006/0149633 A1* | 7/2006 | Voisin | G06Q 30/0261 705/14.66 |
| 2007/0027768 A1 | 2/2007 | Collins | |
| 2007/0078715 A1 | 4/2007 | Murakami | |
| 2008/0201188 A1 | 8/2008 | Heyman | |
| 2009/0125936 A1 | 5/2009 | Kulasekaran | |
| 2010/0250361 A1 | 9/2010 | Torigue et al. | |
| 2012/0047027 A1 | 2/2012 | Kadambi | |

(Continued)

FOREIGN PATENT DOCUMENTS

JP 3842576 B2 * 11/2006

OTHER PUBLICATIONS

Kean Graham, What is Header Bidding?, 2016 (Year: 2016).*

(Continued)

*Primary Examiner* — Tarek Elchanti
(74) *Attorney, Agent, or Firm* — Maynard Cooper & Gale, P. C.; Jon E. Holland

(57) ABSTRACT

Systems and methods are provided for supplying a video advertisement to a web page or application. A main ad server provides an ecosystem to network ad servers from different ad networks. The main ad server can collect and store information about each of the demand tags associated with each of the network ad servers in a database. The main ad server can then review the database in response to an ad call from a publisher to generate an ordered list of the demand tags that correspond to the ad call. The main ad server can then determine if any of the demand tags in the ordered list has a corresponding video header bidding tag and initiate an auction process for all of the demand tags in the ordered list that have a video header bidding tag. The ordered list of demand tags can then be updated based on the results of the auction process.

16 Claims, 6 Drawing Sheets

(56) References Cited

U.S. PATENT DOCUMENTS

| | | | |
|---|---|---|---|
| 2013/0138569 A1* | 5/2013 | Yan | G06Q 30/0261 |
| | | | 705/50 |
| 2015/0287102 A1 | 10/2015 | Gupta et al. | |
| 2015/0310500 A1 | 10/2015 | Nolet et al. | |
| 2017/0061495 A1* | 3/2017 | Lidow | G06Q 30/0275 |
| 2017/0127123 A1 | 5/2017 | Lidow | |

OTHER PUBLICATIONS

Dearborn, et al., U.S. Appl. No. 15/449,451, entitled, "Systems and Methods for Supplying a Video Advertisement to a Publisher," filed Mar. 3, 2017.

* cited by examiner

SYSTEMS AND METHODS FOR PROVIDING VIDEO HEADER BIDDING TO A PUBLISHER

CROSS-REFERENCE TO RELATED APPLICATIONS

This application claims the benefit of U.S. Provisional Application No. 62/591,570, filed on Nov. 28, 2017 and entitled "Systems and Methods for Providing Video Header Bidding to a Publisher," and is a continuation-in-part of U.S. patent application Ser. No. 15/449,451, filed on Mar. 3, 2017 and entitled "Systems and Methods for Supplying a Video Advertisement to a Publisher," both of which applications are hereby incorporated by reference in its entirety.

BACKGROUND

The present application generally relates to systems and methods for providing video header bidding to a publisher.

In the field of on-line advertising, an ad (advertising) network can be used to connect advertisers with publishers (e.g., web sites (or applications) that want to host advertisements on their web sites (or applications)). The ad network can aggregate ad space supply from publishers and then match the ad space supply with advertiser demand for the ad space. Many ad networks arbitrage ad space by buying ad space, and then reselling the ad space to another partner (e.g., another ad network, an ad agency, etc.) rather than providing an ad (advertisement) for the ad space. Often times, multiple ad networks can arbitrage a single ad space before an ad can be provided to the ad space. The arbitraging of ad space can result in a long process involving ad calls to a sequence of ad servers (used by the corresponding ad networks) before the actual ad is obtained for the ad space. The sequence of ad calls requesting an ad for the ad space can be referred to as a call chain. A response to an ad call can include a demand tag with either the ad (or creative) itself or another ad call to contact another ad server to determine if that ad server has the ad, which results in another step in the sequence or "link" in the chain. The process of navigating a call chain and calling multiple ad servers in order to obtain an ad can result in a significant delay before the ad is available to the ad space and can result in a substantial load on a browser attempting to display a web site with an ad space.

In addition, when an ad network is navigating a call chain to obtain an ad, the ad network can traffic a demand tag returned from another ad network into the originating ad network's waterfall associated the original ad call. A waterfall for an ad call is a list of demand tags (or campaigns) that satisfy the requirements of the ad call. The ad network progresses sequentially through the demand tags of the waterfall until an ad is returned. The returned demand tag from another ad network in response to an ad call in a demand tag of the waterfall can have an aggregate fill rate (i.e., the likelihood that an ad is provided for the ad space), and be positioned in the waterfall based on the aggregate fill rate. However, most demand tags can include ad calls to several demand sources (at corresponding ad servers), where each of the demand sources can have different fill rates, some that are higher and some that are lower than the aggregate fill rate. The performance of the original ad call (also referred to as a supply tag), from a revenue perspective, is not optimal because all of the demand sources of a returned demand tag are stuck in the same position of the waterfall as the demand tag and a less optimal ad may be selected for the ad space over a more optimal ad as a result of the less optimal ad being acquired first.

A publisher may also want to use video header bidding to generate revenue.

One technique to implement video header bidding is to implement display header bidding methodologies in the video player of the publisher. However, video players don't have a header, so the methodologies that work for display header bidding are unstable and difficult to scale with respect to video applications using video players. Thus, publishers who wish to implement video header bidding face several technical challenges such as enabling communications between the video player and the ad servers that are providing bids. In addition, the submission of a bid does not require the ad server to actually provide a video to the video player and then the video player has to restart the bidding process to obtain another video to display which can be time consuming and require additional processing resources.

SUMMARY

The present application generally pertains to systems and methods for supplying a video advertisement to a publisher. A main ad server is provided that incorporates a plurality of network ad servers from different ad networks. The main ad server provides a common ecosystem for the network ad servers such that communication between the corresponding network ad servers is simplified (e.g., communication protocol information does not have to be exchanged). In addition, the main ad server can also collect and store information in an ad database about each of the campaigns or demand tags associated with each of the network ad servers that are included within the main ad server. When an ad call is made from a publisher to one of the network ad servers, the main ad server can process the ad call and review the ad database to determine the campaigns or demand tags from the network ad servers that satisfy the requirements of the ad call without having to sequentially process individual ad calls to network ad servers identified within one or more demand tags. Once the campaigns or demand tags that satisfy the ad call have been determined, the main ad server can generate a prioritized list of campaigns or demand tags based on priorities established by the publisher who submitted the ad call. The prioritized list of demand tags can then be sequentially processed until a video advertisement is provided to the publisher. If a demand tag in the priority list calls a third party ad server, i.e., an ad server that is not included in the main ad server, the main ad server can submit an ad call to the third party ad server and receive a demand tag from the third party ad server.

The main ad server can also facilitate video header bidding for a publisher by providing the interface between the video player and the network ad servers that are willing to provide bids. A video header bidding tag can be included in the ad database with the demand tags associated with the network ad servers that are willing to provide bids or participate in an auction. To implement video header bidding, the main ad server can generate the prioritized list as described above, but when the main ad server identifies a demand tag in the prioritized list with an associated video header bidding tag, the main ad server can initiate an auction process with all of the network ad servers having demand tags in the prioritized list with associated video header bidding tags. The main ad server can simultaneously send a request for bid information to the network ad servers having demand tags in the prioritized list with associated video header bidding tags. The main ad server can then receive responses from some or all of the network ad servers that received the request and update the prioritized list based on the responses. The main ad server can remove a demand tag from the prioritized list if the network ad server does not respond to the request for bid information or did not respond to the request for bid information within a predetermined time period for responding established by the main ad server. Some updates to the prioritized list can include just updating information for the demand tags with network ad servers that responded to the request for bid information. Other updates include adjusting the order or sequence of some or all of the demand tags in the prioritized list. The updated list of demand tags can then be sequentially processed until a video advertisement is provided to the publisher and played in the video player.

One advantage of the present application is that it reduces the latency period before a video ad is provided to a user device by reducing the number of steps (or hops) in the process.

Another advantage of the present application is that less ad calls are made from the user's browser.

Still another advantage of the present application is that it is less resource intensive on ad servers by reducing the processing bandwidth consumed by the ad server and by reducing the data aggregation bandwidth consumed by the ad server.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
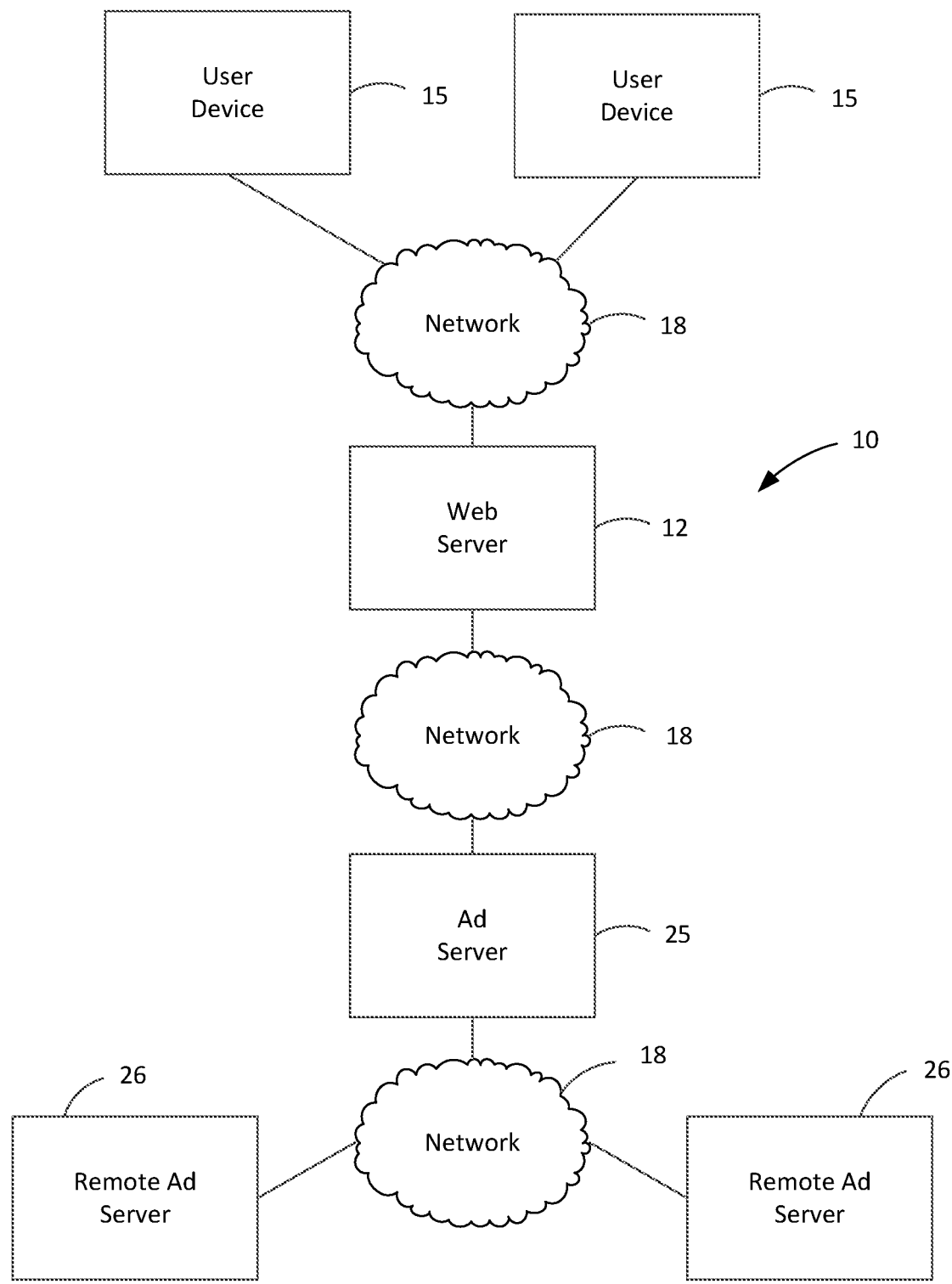
FIG. 1 is a block diagram showing an embodiment of a video advertising system.

FIG. 1 shows an embodiment of a video advertising system 10. The system 10 includes a web server 12 for hosting a website, a mobile application and/or a connected system which can be accessed by one or more user devices 15 over a network 18. Each user device 15 is communicatively coupled to the network 18 and may be any device capable of exchanging, i.e., sending and receiving, instructions, data and/or information with the web server 12. The user device 15 can be, but is not limited to, a desktop, laptop or tablet computer, a hand-held device, such as a cellular telephone (e.g., a smartphone) or portable gaming device, a television, a video game system, a still and/or video camera, and/or an attachable, wearable, implantable or non-invasive computer or device. The user device 15 can have one or more input devices to permit a user to enter instructions, data and/or information for the web server 12 and one or more output devices to permit the user to display instructions, data and/or information received from the web server 12. In one embodiment, the user device 15 can include a touch screen interface that can both display content received from the web server 12 and receive touch inputs from the user for the web server 12.

The network 18 can be the Internet and use the transmission control protocol/Internet protocol (TCP/IP) for communication in an embodiment. However, in other embodiments, the network 18 may be an Intranet, a local area network (LAN), a wide area network (WAN), a Near Field Communication (NFC) network, or any other type of communication network using one or more communication protocols.

Figure 2:
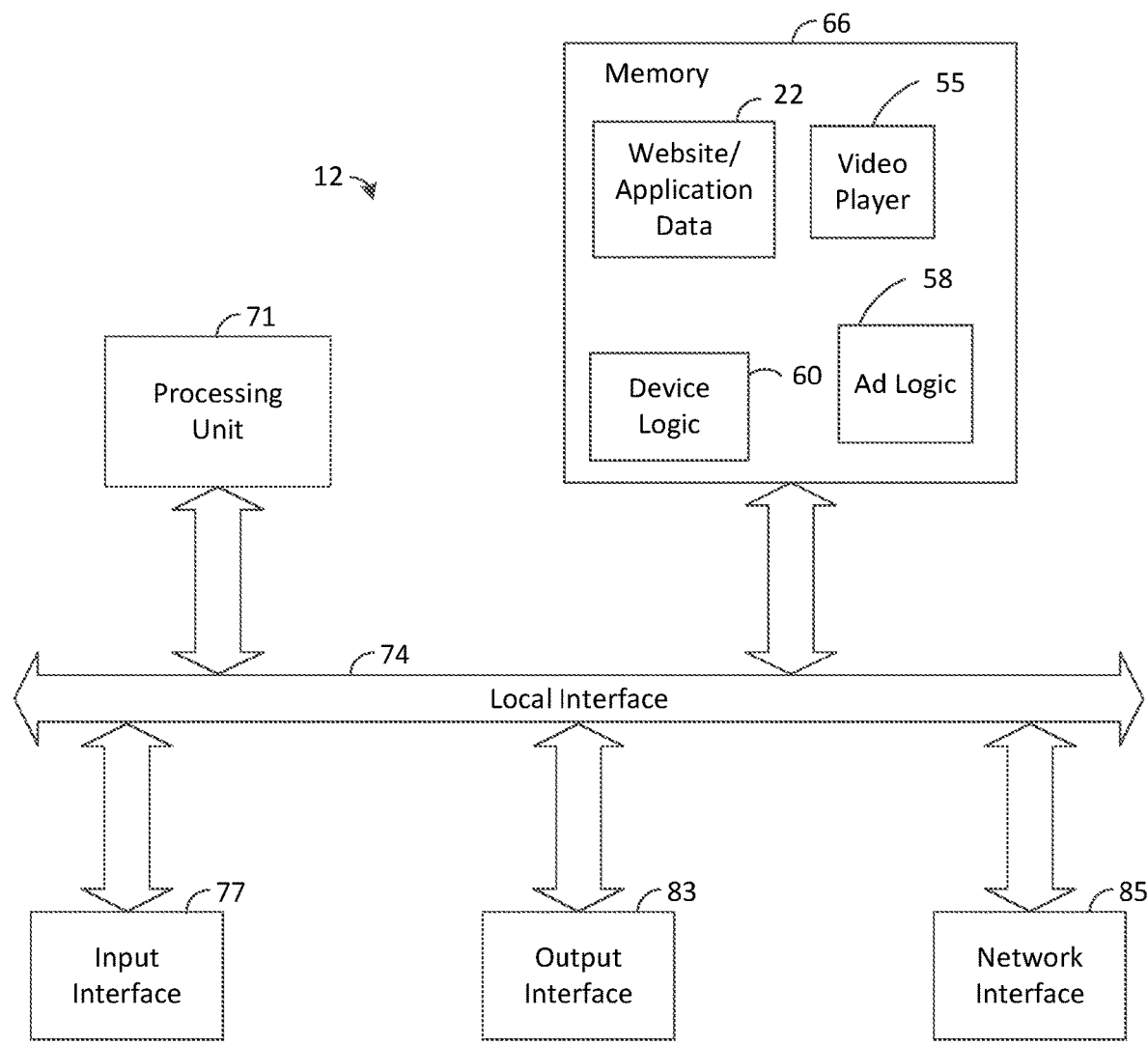
FIG. 2 is a block diagram showing an embodiment of a web server.

FIG. 2 shows an embodiment of the web server 12. The web server 12 may be implemented as one or more general or special-purpose computers, such as a laptop, hand-held (e.g., smartphone), desktop, or mainframe computer. The web server 12 can include logic 60, referred to herein as "device logic," for generally controlling the operation of the web server 12, including communicating with the user devices 15 and ad server 25 (see FIG. 1) of the advertising system 10. The web server 12 also includes logic 55, referred to herein as a "video player," to display videos in one or more web pages (or applications) on the user device 15 and ad logic 58 to control the requesting and displaying of ads (e.g., video ads) in one or more web pages (or applications). The device logic 60, ad logic 58 and the video player 55 can be implemented in software, hardware, firmware or any combination thereof. In the web server 12 shown in FIG. 2, the device logic 60, ad logic 58 and the video player 55 are implemented in software and stored in memory 66 of the web server 12. Note that the device logic 60, ad logic 58 and the video player 55, when implemented in software, can be stored and transported on any non-transitory computer-readable medium for use by or in connection with an instruction execution apparatus, e.g., a microprocessor, that can fetch and execute instructions. In the context of this application, a "computer-readable medium" can be any device, system or technique that can contain or store a computer program for use by or in connection with an instruction execution apparatus.

The web server 12 includes at least one conventional processing unit 71, such as at least one digital signal processor or central processing unit (CPU), that communicates to and drives the other elements within the web server 12 via a local interface 74, which can include at least one bus. Furthermore, an input interface 77, for example, a keyboard, a mouse, touchscreen, sensor or any other interface device or apparatus, can be used to input data from a user of the web server 12, and an output interface 83, for example, a printer, monitor, liquid crystal display (LCD), or other display apparatus, can be used to output data to the user of the web server 12. Further, a network interface 85, such as at least one modem, may be used to communicate data over the network 18.

The web server 12 can, for example, store in memory 66 website/application data 22 that defines a website and/or application that can be accessed by any of the user devices 15. If the web server 12 is communicating with an application on the user device 15, then the website/application data 22 would also include data used by the application. In addition, the website/application data 22 may include one or more webpages that can be retrieved and rendered by a web browser on the user device 15. In one embodiment, one of the webpages or applications included within the website/application data 22 can embed video player 55 in the web page or application and use the video player 55 to display one or more videos on the user device 15 for viewing by the user. The videos displayed by the webpage (or application) can include informational videos, entertainment videos, advertising videos (e.g., video advertisements), and/or other types of videos. Advertising videos can be displayed either before, after or during (or combinations thereof), the displaying of an informational video or an entertainment video. Alternatively, the advertising video can be displayed independently on the webpage (or application) without being associated with an informational video or entertaining video.

When the ad logic 58 determines that an advertising video should be displayed on a webpage (or application), the ad logic 58 sends a request for an ad (ad call) to the ad server 25 or sends a request to the video player 55, which then sends the request to the ad server 25. The ad server 25 can respond to the request with a video (or a creative) to be displayed on the web page (or application). The web server 12 can communicate with the ad server 25 over the network 18 to receive the advertising video to be displayed on the webpage (or application) as discussed in detail below.

In one embodiment, the ad logic 58 can be partially or entirely incorporated into the video player 55 and/or into the website/application data 22 for a website or application. In another embodiment, the web browser of the user device 15 can make a request to the ad server 25 for the ad when the ad logic 58 has been incorporated into the website data 22. In other embodiments, the video player 55 may be provided by a third party and accessed over network 18 by the web server 12.

Figure 3:
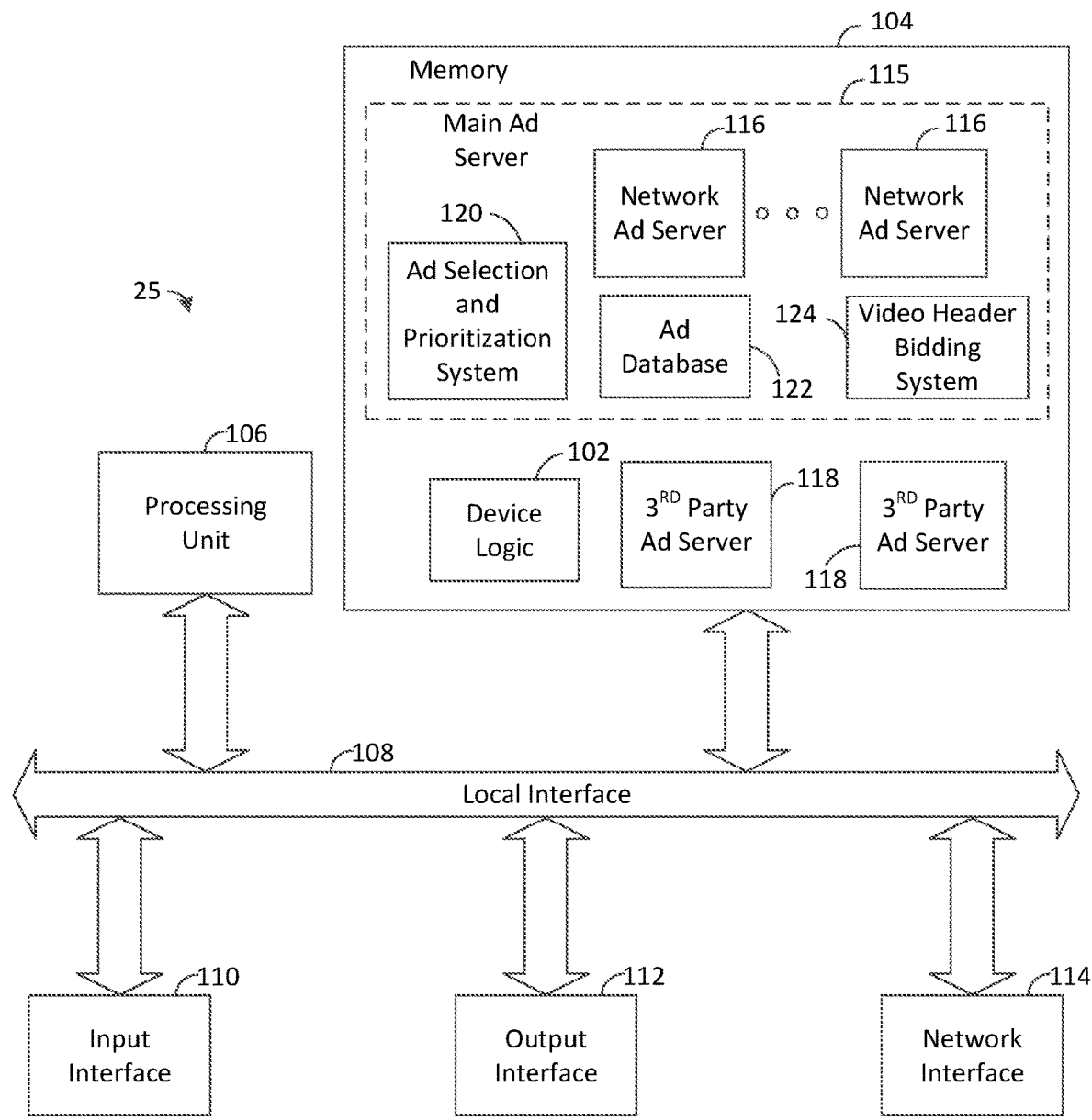
FIG. 3 is a block diagram showing an embodiment of an ad server.

FIG. 3 shows an embodiment of the ad server 25. The ad server 25 may be implemented as one or more general or special-purpose computers, such as a laptop, hand-held (e.g., smartphone), desktop, or mainframe computer. The ad server 25 can include logic 102, referred to herein as "device logic," for generally controlling the operation of the ad server 25, including communicating with the web server 12 and other remote ad servers 26 (see FIG. 1) of the advertising system 10. The ad server 25 also includes logic 116, referred to herein as a "network ad server," to review and process ad calls for an ad network, and logic 115, referred to herein as a "main ad server," to provide an ecosystem or infrastructure for the interaction between the network ad servers 116 and the operation of the network ad servers 116. The ad server 25 can further include logic 118, referred to herein as a "$3^{rd}$ party ad server," to review and process ad calls for an ad network that is not included within the main ad server 115. The main ad server 115 can also include an ad selection and prioritization system 120 that selects the demand tags (which are used to access the ads (videos)) from an ad database 122 that satisfy the requirements (also referred to as targeting information or selection criteria) of an ad call received by one of the network ad servers 116. Once the ad selection and prioritization system 120 has obtained the demand tags satisfying the ad call requirements, the system 120 can then prioritize the demand tags such that the better performing demand tags (e.g., demand tags for ads that generate the most revenue) are provided in response to the ad call over lower performing demand tags (e.g., demand tags for ads that generate less revenue). The main ad server 115 can also include a video header bidding system 124 to perform the video header bidding process. While the video header bidding system 124 is shown as a separate system in FIG. 3, the video header bidding system 124 can be incorporated into the ad selection and prioritization system 120 in other embodiments.

The device logic 102, the main ad server logic 115, the network ad server logic 116, the $3^{rd}$ party ad server logic 118, the ad selection and prioritization system 120 and the video header bidding system 124 can be implemented in software, hardware, firmware or any combination thereof. In the ad server 25 shown in FIG. 3, the device logic 102, the main ad server logic 115, the network ad server logic 116, the $3^{rd}$ party ad server logic 118, the ad selection and prioritization system 120 and the video header bidding system 124 are implemented in software and stored in memory 104 of the ad server 25. Note that the device logic 102, the main ad server logic 115, the network ad server logic 116, the $3^{rd}$ party ad server logic 118, the ad selection and prioritization system 120 and the video header bidding system 124, when implemented in software, can be stored and transported on any non-transitory computer-readable medium for use by or in connection with an instruction execution apparatus, e.g., a microprocessor, that can fetch and execute instructions.

The ad server 25 includes at least one conventional processing unit 106, such as at least one of a digital signal processor or central processing unit (CPU), that communicates to and drives the other elements within the ad server 25 via a local interface 108, which can include at least one bus. Furthermore, an input interface 110, for example, a keyboard, a mouse, touchscreen, sensor or any other interface device or apparatus, can be used to input data from a user of the ad server 25, and an output interface 112, for example, a printer, monitor, liquid crystal display (LCD), or other display apparatus, can be used to output data to the user of the ad server 25. Further, a network interface 114, such as at least one modem, may be used to communicate data over the network 18.

The main ad server 115 can provide an ecosystem or environment to simplify the interactions between a network ad server 116 and the web server 12 and between the network ad server 116 and another network ad server 116 of the main ad server 115. In one embodiment, the main ad server 116 can provide an environment such that communication between the network ad servers 116 is simplified. For example, communication protocol information or tags do not have to be exchanged by network ad servers 116 when communicating with each other because the network ad servers 116 are trusted and operating within the controlled environment of the main ad server 115. The simplification of communication between network ad servers 116 can expedite the process of stepping through a call chain in response to an ad call as described below.

The ad server 25 can, for example, store in memory 104 the ad database 122 that includes information on each of the ads (e.g., advertising videos and other forms of advertisements) or campaigns (i.e., a group of ads sharing a single theme) provided by the ad networks associated with the network ad servers 116. For each ad or campaign, the ad database 122 can store information in a table or record regarding the demand tag(s) associated with the ad or campaign. For example, if a campaign included 5 ads, the ad database 122 can store a demand tag for each of the ads, thereby storing 5 demand tags.

For each demand tag, the actual advertising video (or a link to the advertising video) or an ad call to an ad server (e.g., network ad server 116, $3^{rd}$ party ad server 118 or remote ad server 26) is included in the table or record in the ad database 122 as part of the demand tag. Since the ad database 122 has information on the ad calls associated with the demand tags, the ad database 122 can include information regarding an end tag that identifies the end of the call chain associated with each ad call in the table or record associated with the demand tag.

In one embodiment, for a demand tag having an ad call to another ad server (instead of an advertising video), the main ad server 115 or the ad selection and prioritization system 120 can check the ad database 122 for the ad server called in the ad call. If the ad server is a network ad server 116 of the main ad server 115, the main ad server 115 or the ad selection and prioritization system 120 can then review the ad database 122 for campaigns or ads of that network ad server 116 that satisfies the requirements of the ad call in the demand tag. The process of checking the ad database 122 for network ad servers 116 and corresponding campaigns or ads of the network ad servers 116 can be repeated by the main ad server 115 or the ad selection and prioritization system 120 for each newly identified demand tag with an ad call until the advertising video (or a link to the advertising video) is identified or the ad call is to the $3^{rd}$ party ad server 118 or the remote ad server 26. The main ad server 115 or the ad selection and prioritization system 120 can then store the information about the end of the call chain for the demand tag in the ad database 122 in the corresponding end tag for the demand tag. The information in the end tag about the end of the call chain for each demand tag can include an advertising video (or a link to the advertising video) or an ad call to a $3^{rd}$ party ad server 118 or a remote ad server 26. When a demand tag with an ad call is selected in response to an ad call, the ad selection and prioritization system 120 can proceed directly to the end tag (since it is stored in ad database 122) to reach the end of the call chain without having to progress through the call chain.

In one embodiment, the table or record in the ad database 122 associated with the demand tag can include a pre-assigned priority for the demand tag based on factors specified by the publisher (e.g., the web server 12) requesting an ad by submitting an ad call to the ad server 25. The prioritized demand tags can then be assembled into an ordered list in the ad database 122 based on their pre-assigned priorities. In one embodiment, the demand tags can be ordered based on the network ad server 116 to which the demand tags are associated. However, in other embodiments, the demand tags can be ordered with respect to the main ad server 115 (i.e., the demand tags for all of the network ad servers 116 are ordered). As part of the selection process by the ad selection and prioritization system 120, the ordered list of demand tags in the ad database 122 can be filtered based on the targeting information or selection criteria included with an ad call such that the resulting filtered list of demand tags are already in a prioritized order when responding to the ad call. In an embodiment, the priorities assigned to the demand tags in the ad database 122 can be periodically updated to reflect new priorities for the demand tags as established by the publisher.

Figure 4:
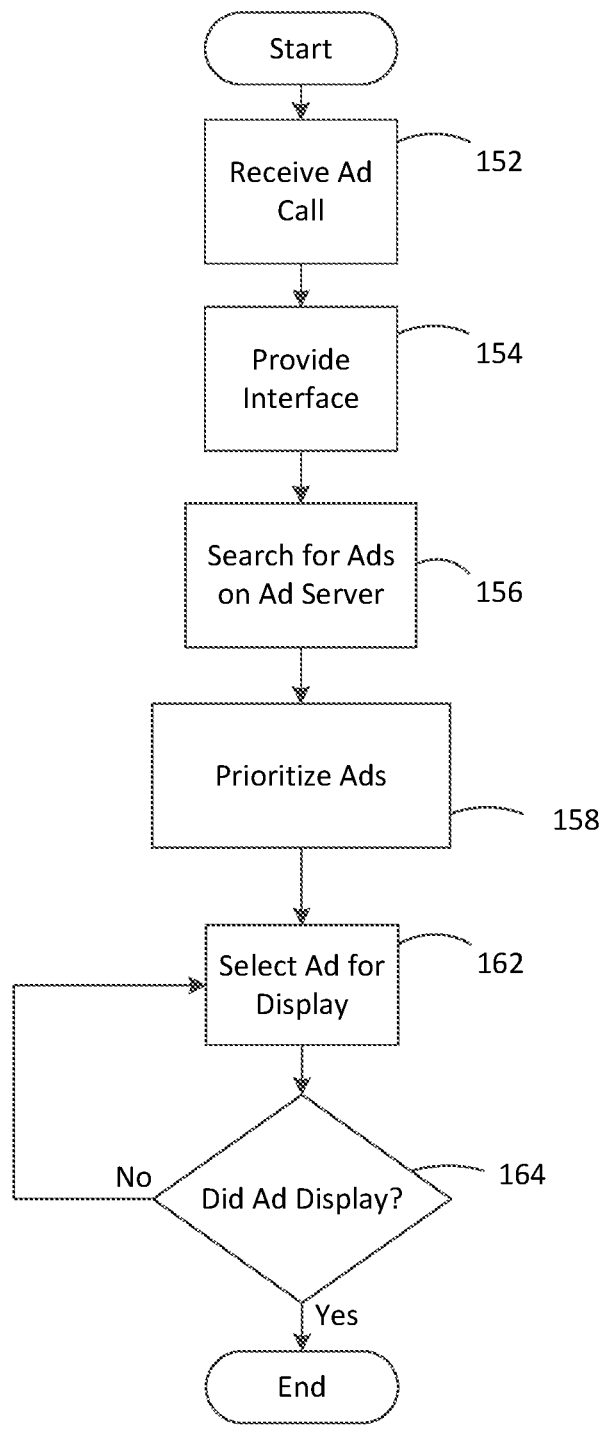
FIGS. 4 and 5 show embodiments of processes for providing a video advertisement to a publisher.

FIG. 4 shows an embodiment of a process for providing a video advertisement to a web page or application. The process begins with the ad server 25 receiving an ad call (step 152). The ad server 25 can receive the ad call from ad logic 58 associated with a publisher (e.g., the web server 12, the video player 55 or the web page or application). The ad server 25 then routes the ad call to the corresponding ad server (e.g., network ad server 116) associated with the ad network included in the ad call. In one embodiment, the main ad server 115 can process the ad calls on behalf of the network ad servers 116. In another embodiment, the main ad server 115 can be the corresponding ad server for the ad network identified in the ad call. When the main ad server logic 115 receives an ad call, the main ad server logic 115 can provide an interface (step 154) to the source of the ad call (e.g., web server 12, video player 55 or the web page or application). The interface is used to standardize communications between the ad server 25 and the source of the ad call. The interface is used at both the ad server 25 and the source of the ad call and enables the ad server 25 to control the video player 55. In one embodiment, the interface can be VPAID (Video Player Ad-serving Interface Definition) that enables the ad network and the advertiser to collect playback and user-interaction details on a played video advertisement. In other embodiments, the interface can use VAST (Video Ad-Serving Template), MRAID (Mobile Rich media Ad Interface Definition) or SafeFrame. In alternate embodiment, the ad server 25 (or main ad server 115) can decide not to respond to the ad call received in step 152 and the process can end.

In response to receiving the interface from the main ad server logic 115, the source of the ad call can submit a request or ad call via the interface to the main ad logic 115. When the main ad server logic 115 receives the request or ad call through the interface, the main ad server logic 115 can have the ad selection and prioritization system 120 initiate a search of the ad database 122 for demand tags that satisfy the requirements in the ad call (step 156). The ad selection and prioritization system 120 can search the ad database 122 to determine if one or more of the network ad servers 116 has one or more demand tags, which correspond to advertising videos or paths to advertising videos, that satisfy the requirements in the ad call. In one embodiment, the demand tags can be selected based on targeting or selection criteria included with the ad call. The targeting or selection criteria used to select (or filter) the demand tags can include factors such as geolocation, user cookies, and/or the number of views of a particular advertising video for a demand tag.

Once the ad selection and prioritization system 120 has identified the demand tags that satisfy the ad call, the ad selection and prioritization system 120 can order the demand tags (step 158) based on priority criteria established by the publisher. In one embodiment, as described above, the demand tags for a network ad server 116 are organized into a prioritized list in ad database 122, thereby providing a pre-prioritized list of the results satisfying the ad call. In another embodiment, the ad selection and prioritization system 120 can generate a random list of demand tags satisfying the ad call and then prioritize the demand tags based on criteria established by the publisher and/or by the ad server 25.

In one embodiment, the demand tags can be prioritized based on factors such as the fill rate for the ad (the percentage of time an advertising video is returned to the video player 55), the response time (the time to get the advertising video to the video player 55), the revenue from the ad and combinations thereof. In other embodiments, other criteria such as CPM (cost per thousand impressions) can be used to prioritize the returned ads. In one embodiment, the information on the criteria (e.g., fill rate, response time and revenue) can be provided by the corresponding advertiser who generated the ad.

The prioritized ads can then be selected by the main ad server logic 115 for display on the video player 55 of the web page or application (step 162) using the interface. The main ad server logic 115 can use the end of the call chain information in the end tag for the selected demand tag in ad database 122 in order to more quickly access the advertising video. In one embodiment, the main ad server logic 115 can select the demand tag with the highest priority for display, but may select other demand tags in other embodiments. The main ad server logic 115 can then determine whether the advertising video for the selected demand tag was displayed by the video player 55 for the web page or application (step 164). If the advertising video was displayed, then the process ends, but if the advertising video wasn't returned and/or displayed, the main ad server logic 115 can then return to step 162 and select a new demand tag and associated advertising video for display.

Figure 5:
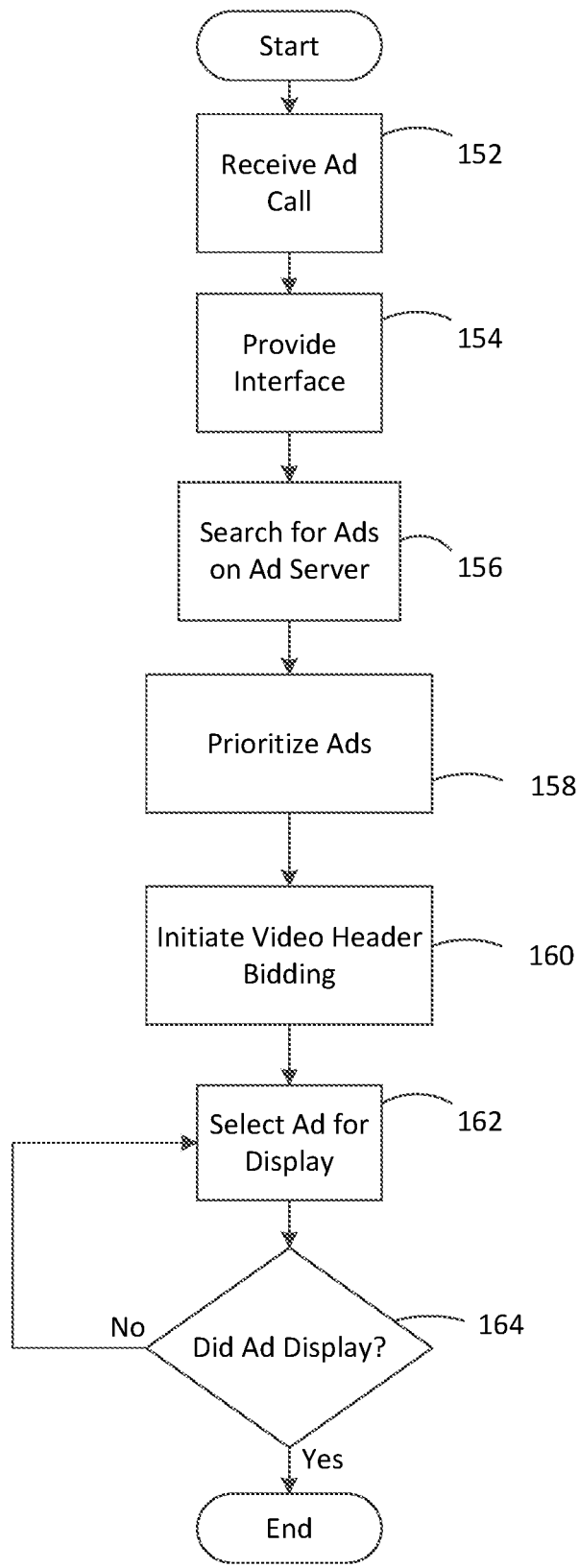

The embodiment of the process of FIG. 5 is similar to the process of FIG. 4, except that after the demand tags are ordered or prioritized in step 158, the video header bidding system 124 can initiate the video header bidding process (step 160). In one embodiment, the video header bidding process of step 160 can use the process shown in FIG. 6, but other video header bidding processes are possible in other environments. In another embodiment, the process of FIG. 5 can include an optional re-prioritization step after the completion of the video header bidding in step 160. The re-prioritization step can re-order the demand tags from the ordered list based on the results of the video header bidding process.

Figure 6:
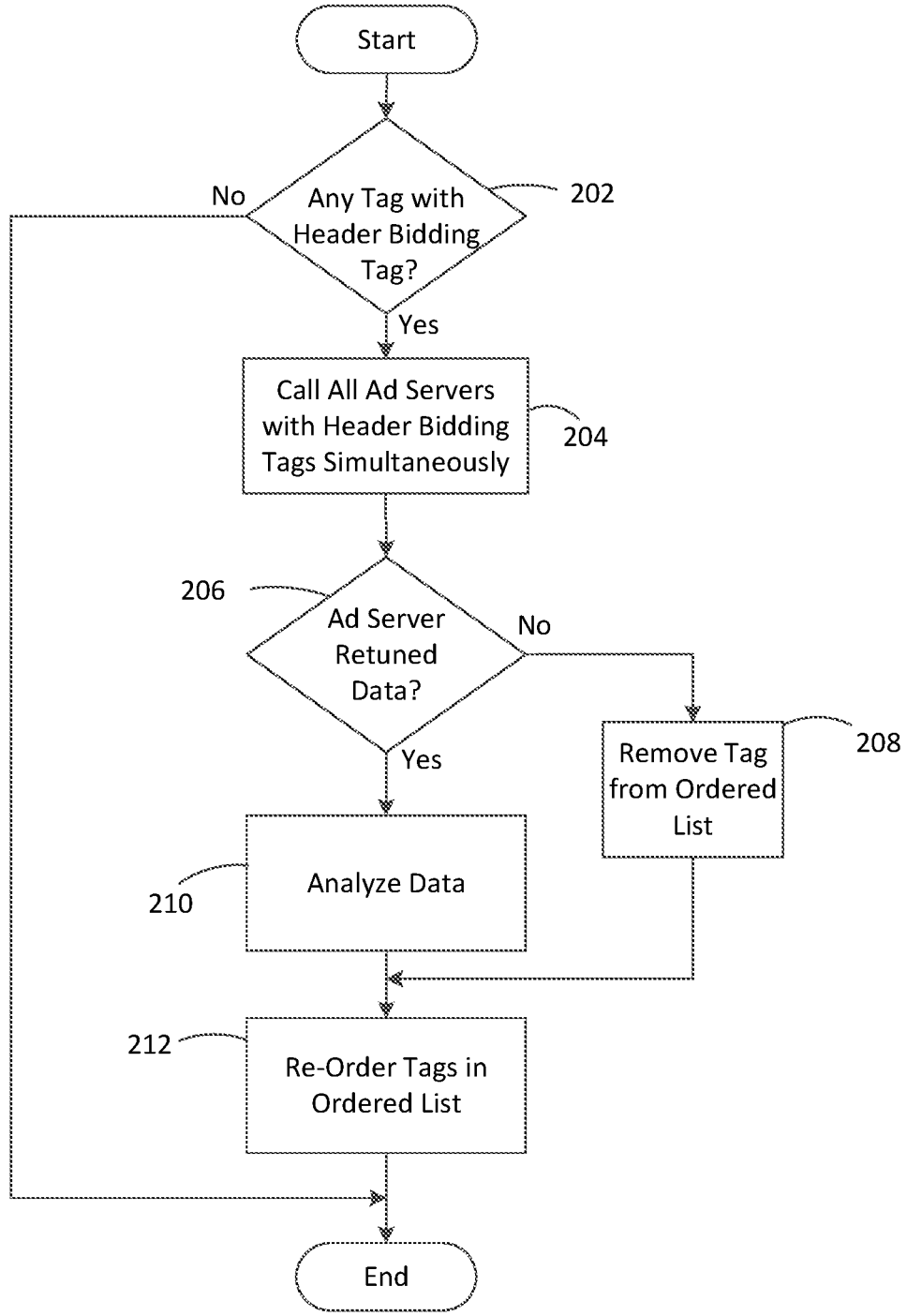
FIG. 6 shows an embodiment of a process for performing video header bidding.

FIG. 6 shows an embodiment of a process for performing video header bidding. The process begins with the video header bidding system 124 reviewing each of the demand tags in the ordered or prioritized list from step 158 of FIG. 5 to determine if a demand tag in the list has an associated header bidding tag (step 202). The association of a header bidding tag with the demand tag indicates that the corresponding network ad server 116 or $3^{rd}$ party ad server 118 for the demand tag can participate in an auction to provide the advertising video to the video player 55. In one embodiment, information regarding an associated header bidding tag for a demand tag can be stored in ad database 122.

If none of the demand tags in the ordered list have an associated header bidding tag, then none of the ad servers are willing to participate in an auction and the process ends. If one (or more) of the demand tags in the ordered list has an associated header bidding tag, the video header bidding system 124 can initiate an auction process by substantially simultaneously sending out a call or request for bids to the ad servers associated with the demand tags in the ordered list that have a header bidding tag (step 204). In one embodiment, the video header bidding system 124 can include the logic and/or information required to communicate with each of the ad servers that may participate in video header bidding. Next, the video header bidding system 124 can determine if each of the ad servers that were sent the request for a bid returned a response and/or data (step 206).

If an ad server did not return a response and/or data, the video header bidding system 124 can remove the corresponding demand tag for the ad server from the ordered list (step 208). For the ad servers that did return a response and/or data (e.g., a cost per impression (CPI) bid or a cost per thousand impressions (CPM) bid), the video header bidding system 124 can analyze the data (step 210). An impression can occur when the advertising video is obtained from its corresponding source or ad server (e.g., the ad is displayed from step 164 of FIG. 5). In one embodiment, the ad servers returning responses and/or data with bid information may return those responses and or data asynchronously (i.e., not at the same time). Thus, the video header bidding system 124 may use a predefined response window or time period to permit the ad servers to respond. If the ad servers do not respond in the predefined response window, the video header bidding system 124 can determined that the ad server did not return a response and/or data in step 206.

In an embodiment, after the video header bidding system 124 has analyzed the data returned from the ad servers, the video header bidding system 124 may conduct an auction that gives the responding ad servers an opportunity to update their responses and/or data (e.g., increase CPI or CPM bid information). Based on the analyzed responses and/or data received from the ad servers as generated in step 210, which may include updated responses and/or data based on an auction, and the determination to remove demand tags based on a failure to provide a response and/or data by the ad servers in step 208, the video header bidding system 124 or the ad selection and prioritization system 120 can re-order the tags in the ordered list (step 212).

In one embodiment, the ordered list can be re-ordered to maintain the previous order of the demand tags that were not called by the video header bidding system 124 and the demand tags associated with ad servers that respond to the request for bid from the video header bidding system 124 after removal of the demand tags associated with ad servers that did not respond to the request for bid from the video header bidding system 124. In other words, a demand tag in the ordered list can "move up" in priority upon the removal of a demand tag having a higher priority than that demand tag. Otherwise the order of the demand tags relative to the ones remaining in the ordered list does not change.

In another embodiment, the demand tags in the ordered list can be re-ordered based on the response and/or data provided by the associated ad server for the demand tag. For example, if the data provided by the ad servers includes bid information, the demand tags can be re-ordered, as appropriate, based on the bid information provided by the associated ad servers. In one embodiment, the re-ordering of the demand tags can occur in the subset of demand tags in the ordered list that had header bidding tags, while the demand tags that did not include header bidding tags maintain their relative order in the ordered list. In another embodiment, the re-ordering of the demand tags can re-order all of the demand tags regardless of whether the demand tag had a header bidding tag based on bid information or other information stored in ad database 122.

Embodiments within the scope of the present application include program products with machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Combinations of the above are also included within the scope of machine-readable media. Machine-executable instructions include, for example, instructions and data which cause a general purpose computer, special purpose computer, or special purpose processing machine to perform a certain function or group of functions. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A computer implemented method of obtaining an advertisement to provide to a user device, the method comprising:
storing, by a main ad server, a plurality of advertisements in an ad database, wherein each advertisement of the plurality of advertisements is associated with an ad server of a plurality of ad servers incorporated within the main ad server, and wherein the ad database includes, for each advertisement of the plurality of advertisements, a demand tag including an ad call initiating a sequence of ad calls to access the advertisement and an end tag corresponding to an end of the sequence of ad calls and including information regarding accessing the advertisement;
generating a header bidding tag for each advertisement of the plurality of advertisements having an associated ad server willing to participate in an auction to provide an advertisement to a publisher, wherein the generated header bidding tag is stored in the ad database and associated with the advertisement;
receiving, at an ad server of the plurality of ad servers, a request for an advertisement from a publisher, wherein the request includes at least one selection criteria;
providing, by the main ad server, an interface to communicate with the publisher;
generating, by the main ad server, a first ordered list of advertisements from the ad database complying with the at least one selection criteria in the request;
generating, by the main ad server, a second ordered list of advertisements from the first ordered list of advertisements, wherein each advertisement in the second order list of advertisements includes a header bidding tag;
sending, by the main ad server, a request for bid information to an associated ad server of each advertisement in the second ordered list of advertisements;
receiving, by the main ad server, bid information from one or more associated ad servers of the advertisements in the second ordered list of advertisements;
analyzing, by the main ad server, the received bid information from the one or more associated ad servers;
re-ordering, by the main ad server, the advertisements in the second ordered list of advertisements based on the analyzed bid information;
removing, by the main ad server, an advertisement from the re-ordered second ordered list of advertisements in response to the associated ad server for the advertisement in the second ordered list of advertisements failing to provide bid information in response to the request for bid information; and
providing, by the main ad server, an advertisement from the re-ordered second ordered list of advertisements to a video player, wherein the video player is configured to display the advertisement on a user device.

2. The method of claim 1, wherein the sending the request for bid information to the associated ad server of each advertisement in the second ordered list of advertisements includes simultaneously sending a request for bid information to an associated ad server of each advertisement in the second ordered list of advertisements.

3. The method of claim 1, further comprising providing a second advertisement from the re-ordered second ordered list of advertisements to the video player in response to the provided advertisement not playing in the video player.

4. The method of claim 1, wherein the receiving bid information includes providing, by the main ad server, a predetermined response window to receive bid information from the one or more associated ad servers with advertisements in the second ordered list of advertisements.

5. The method of claim 1, wherein the received bid information includes one of a cost per impression bid or a cost per thousand impressions bid.

6. The method of claim 1, further comprising:
sending, by the main ad server, a request for updated bid information to the one or more associated ad servers of the advertisements in the second ordered list of advertisements providing bid information to the main ad server;
receiving, by the main ad server, updated bid information from the one or more associated ad servers of the advertisements in the second ordered list of advertisements; and
analyzing, by the main ad server, the received updated bid information from the one or more associated ad servers.

7. The method of claim 6, wherein the re-ordering of the advertisements in the second ordered list of advertisements includes re-ordering the advertisements in the second ordered list of advertisements based on the analyzed updated bid information.

8. The method of claim 1, wherein the receiving bid information includes receiving bid information asynchronously from the one or more associated ad servers of the advertisements in the second ordered list of advertisements.

9. An advertising server to obtain advertisements for distribution to a publisher over a network, the advertising server comprising:
a main ad server, the main ad server comprising:
a plurality of network ad servers, each network ad server of the plurality of network ad servers including at least one video advertisement; and
an ad database storing information relating to each video advertisement of a plurality of video advertisements provided by the plurality of network ad servers, the plurality of video advertisements including the at least one video advertisement from each network ad server of the plurality of network ad servers, the ad database including, for each video advertisement of a plurality of video advertisements, a demand tag including an ad call initiating a sequence of ad calls to access the video advertisement and an end tag corresponding to an end of the sequence of ad calls and including information regarding accessing the video advertisement, wherein the ad database further includes a video header bidding tag for at least a subset of video advertisements of the plurality of video advertisements, the video header bidding tag indicating that the network ad server for the corresponding video advertisement is willing to participate in an auction to provide a video advertisement to a publisher;
a processing unit coupled to the main ad server and configured to execute instructions; and
a memory having the instructions stored thereon and coupled to the processing unit to provide the instructions to the processing unit, wherein the instructions cause the processing unit to:
  receive a request for a video advertisement from a publisher, wherein the request includes at least one selection criteria;
  providing an interface to communicate with the publisher;
  generate a first ordered list of video advertisements from the ad database complying with at least one selection criteria in the request;
  generate a second ordered list of video advertisements from the first ordered list of video advertisements, wherein each video-advertisement from in the second ordered list of video advertisements includes a video header bidding tag;
  initiate an auction process involving the corresponding network ad servers of the video advertisements in the second ordered list of video advertisements;
  update the second ordered list of video advertisements based on the auction process;
  remove a video advertisement from the updated second ordered list of video advertisements in response to the associated ad server for the video advertisement in the second ordered list of video advertisements failing to provide bid information in response to the auction process; and
  provide a video advertisement from the updated second ordered list of video advertisements to a video player associated with the publisher, wherein the video player is configured to display the video advertisement on a user device.

10. The advertising server of claim 9, wherein the instructions cause the processing unit to change a position of at least one video advertisement in the second ordered list of video advertisements based on the auction process.

11. The advertising server of claim 9, wherein the instructions cause the processing unit to simultaneously send a request for bid information to the corresponding network ad servers of the video advertisements in the second ordered list of video advertisements.

12. The advertising server of claim 9, wherein the instructions cause the processing unit to:
  send a request for bid information to a corresponding network ad server of each video advertisement in the second ordered list of video advertisements;
  receive bid information from one or more corresponding network ad servers of the second ordered list of video advertisements; and
  analyze the received bid information from the one or more corresponding network ad servers.

13. The advertising server of claim 9, wherein the instructions cause the processing unit to remove a video advertisement from the updated second ordered list of video advertisements in response to the corresponding network ad server for the video advertisement in the second ordered list of video advertisements failing to provide bid information within a predetermined response window to receive bid information from the network ad servers.

14. The advertising server of claim 12, wherein the received bid information includes one of a cost per impression bid or a cost per thousand impressions bid.

15. A video advertisement system, the system comprising:
  a server in communication with a user device, the server comprising a video player, the video player configured to display a video advertisement on the user device;
  a first ad server coupled to the server via a network, the first ad server comprising:
    a plurality of second ad servers, each second ad server of the plurality of second ad servers corresponding to an ad network and including at least one video advertisement; and
    an ad database storing information relating to the plurality of video advertisements from the plurality of second ad servers, the stored information including, for each video advertisement, a demand tag including an ad call initiating a sequence of ad calls to access the video advertisement, an end tag corresponding to an end of the sequence of ad calls and including information regarding accessing the video advertisement, and a priority level, wherein the stored information further includes a video header bidding tag for at least a first subset of the plurality of video advertisements, the video header bidding tag indicating that the second ad server for the corresponding video advertisement is willing to participate in an auction to provide a video advertisement;
  a processing unit coupled to the first ad server and configured to execute instructions; and
  a memory having the instructions stored thereon and coupled to the processing unit to provide the instructions to the processing unit, wherein the instructions cause the processing unit to:
    receive a request for a video advertisement from the server, wherein the request includes at least one selection criteria;
    providing an interface to communicate with the server;
    generate a first ordered list of video advertisements from the ad database complying with the at least one selection criteria in the request;
    generate a second ordered list of video advertisements from the first ordered list of video advertisements, wherein each video advertisement in the second order list of advertisements includes a video header bidding tag;
    send a request for bid information to an associated second ad server of each video advertisement in the second ordered list of video advertisements;
    receive bid information from one or more associated second ad servers of the second ordered list of video advertisements;
    analyze the received bid information from the one or more associated second ad servers;
    re-order the video advertisements in the second ordered list of video advertisements based on the analyzed bid information;
    remove a video advertisement from the re-ordered second ordered list of video advertisements in response to the associated second ad server for the video advertisement in the second ordered list of video advertisements failing to provide bid information in response to the request for bid information; and
    provide a video advertisement from the re-ordered second ordered list of video advertisements to the video player, wherein the video player is configured to display the video advertisement on a user device.

16. The system of claim 15, wherein the instructions cause the processing unit to simultaneously send a request for bid information to an associated second ad server of each advertisement in the second ordered list of video advertisements.

* * * * *